United States Patent
Banyas et al.

(10) Patent No.: US 7,418,923 B1
(45) Date of Patent: Sep. 2, 2008

(54) MULTIPLE PERCH SQUIRREL PROOF BIRD FEEDER

(76) Inventors: Michael Banyas, 129 Prayer La., Westminster, SC (US) 29693; Paul Artigues, P.O. Box 48, Oneco, CT (US) 06373

(*) Notice: Subject to any disclaimer, the term of this patent is extended or adjusted under 35 U.S.C. 154(b) by 116 days.

(21) Appl. No.: 11/366,346

(22) Filed: Mar. 2, 2006

(51) Int. Cl.
*A01K 61/02* (2006.01)

(52) U.S. Cl. ................................ 119/57.9

(58) Field of Classification Search ........... 119/52.2, 119/57.8, 52.3, 57.9
See application file for complete search history.

(56) References Cited

U.S. PATENT DOCUMENTS

| | | | |
|---|---|---|---|
| 4,646,686 A | 3/1987 | Furlani | |
| 5,678,507 A | 10/1997 | Kassner | |
| 5,826,540 A | 10/1998 | Bridges | |
| 5,937,787 A * | 8/1999 | Kopis | 119/57.8 |
| 5,964,183 A | 10/1999 | Czipri | |
| 6,119,627 A | 9/2000 | Banyas et al. | |
| 6,418,878 B1 | 7/2002 | Cathell et al. | |
| 6,591,781 B2 | 7/2003 | Hardison | |
| 6,598,561 B1 | 7/2003 | Johns | |
| 6,604,487 B2 | 8/2003 | Lush | |
| 6,619,229 B1 | 9/2003 | Lush | |
| 6,622,654 B2 | 9/2003 | Fasino | |
| 2002/0162275 A1 * | 11/2002 | Robinson | 47/62 N |

* cited by examiner

*Primary Examiner*—Michael R. Mansen
*Assistant Examiner*—Monica L Williams
(74) *Attorney, Agent, or Firm*—Myers & Kaplan, LLC; Sandra M. Drummond

(57) ABSTRACT

A weight sensitive squirrel proof bird feeder with multiple perch rods. In general, a feed reservoir includes perch rods positioned generally perpendicular to an outer surface of the feed reservoir. When a predetermined weight is placed upon the perches, the perches rotate about their longitudinal axis by a motor thereby expelling the source of the weight, typically squirrels or other undesirable animals from the perches.

14 Claims, 8 Drawing Sheets

Fig_2A

Fig_6A

Fig_6B

MULTIPLE PERCH SQUIRREL PROOF BIRD FEEDER

BACKGROUND

I. Field of the Invention

The present invention relates generally to the field bird feeders and more particularly to a weight sensitive squirrel proof bird feeder with multiple perch rods.

II. Description of the Related Art

It is well known that bird feeders tend to attract unwanted animals such as squirrels to the bird feeders, thereby discouraging the desirable birds from feeding on the seed within the bird feeder. In addition, the unwanted animals can deplete the seed supply and potentially destroy the bird feeder. Although there are several devices that attempt to deter unwanted animals such as break-away perches, closing feed doors, shocking perches and the like, there still lacks a bird feeder having an efficient system for deterring unwanted animals.

SUMMARY

In general, the invention features a weight sensitive squirrel proof bird feeder with multiple perch rods. In general, a feed reservoir includes perch rods positioned generally perpendicular to an outer surface of the feed reservoir. When a predetermined weight is placed upon the perches, the perches rotate about their longitudinal axis by a motor thereby expelling the source of the weight from the perches.

In general, in one aspect, the invention features a bird feeder apparatus, including a feed reservoir, a base connected to the feed reservoir, a perch coupled to the base, a motor connected to the perch and held within the base, a biasing means connected between the motor and the base.

In one implementation, the apparatus further includes at least one additional perch coupled to the base.

In another implementation, the perches include a perching end onto which birds can grasp and a coupling end.

In another implementation, the coupling end includes a coupling device for coupling to a respective coupling device.

In another implementation, the coupling device is a perch gear.

In another implementation, the apparatus further includes a ring gear located adjacent the base and coupled to the perch gears.

In another implementation, the apparatus further includes a motor gear connected to the motor.

In another implementation, the motor gear is engaged with the ring gear.

In another implementation, the motor gear is engaged with the perch gears.

In another implementation, the coupling device is perch pulley.

In another implementation, the apparatus further includes a motor pulley connected to the motor.

In another implementation, the apparatus further includes a belt connected between the motor pulley and the perch pulleys.

In another implementation, the apparatus further includes a motor gear connected to the motor.

In another implementation, the apparatus further includes a ring gear connected to one of the perches and engaged with the motor gear.

In another aspect, the invention features a bird feeder apparatus, including an upper assembly having means for feeding birds and a base assembly having multiple perches and being connected to the upper assembly, the base assembly having means for rotating the perches when a weight threshold upon the perches is exceeded.

In another aspect, the invention features a bird feeder apparatus, including a feed reservoir, a feed reservoir base, a motor and perch housing shrouded by the reservoir base, a plurality of perches protruding from the base, a motor coupled to the perches for causing the perches to rotate about a respective longitudinal axis when a weight threshold upon the perches is exceeded and an activation switch located within the base, the activation switch energized when a weight is put upon the perches that causes the activation switch to engage with the base thereby providing power to the motor that causes the rotation in the perches.

One advantage of the invention is that it prevents unwanted animals from grasping the perches for a period of time to allow the animal to feed from the feed reservoir.

Another advantage of the invention is that the amount of feed in the reservoir is prolonged.

Another advantage of the invention is that it requires a low power output to expel the animal from the perches.

Other objects, advantages and capabilities of the invention are apparent from the following description taken in conjunction with the accompanying drawings showing the preferred embodiment of the invention.

DETAILED DESCRIPTION

The embodiments herein disclose a weight sensitive squirrel proof bird feeder with multiple perch rods. In general, a feed reservoir includes perch rods positioned generally perpendicular to an outer surface of the feed reservoir. When a predetermined weight, typically triggered by an unwanted animal, is placed upon the perches, the perches rotate about their respective longitudinal axes by a motor thereby expelling the source of the weight from the perches. The rotation of the perches prevents the animal from grasping the perch.

In a typical embodiment, the feeder is made of two subassemblies. Feed is contained in an upper assembly, which includes a seed reservoir, a cap, a hanger, and a base receptacle. A base assembly includes perch rods, gears, a motor (typically direct current (DC)), a switch, a resilient member (typically a spring), and a housing. The base assembly is typically biased in a neutral position by the resilient member. When a sufficient weight is placed on one or more of the perches, the weight causes the entire base assembly to tilt from the neutral position, thereby activating the switch. Activation of the switch can further be caused by other unusual forces asserted on the perches such as by linear reciprocation. The switch activates the motor, which typically triggers rotation in one or more of the perches, but typically rotates all of the perches simultaneously.

Figures 1A, 1B:
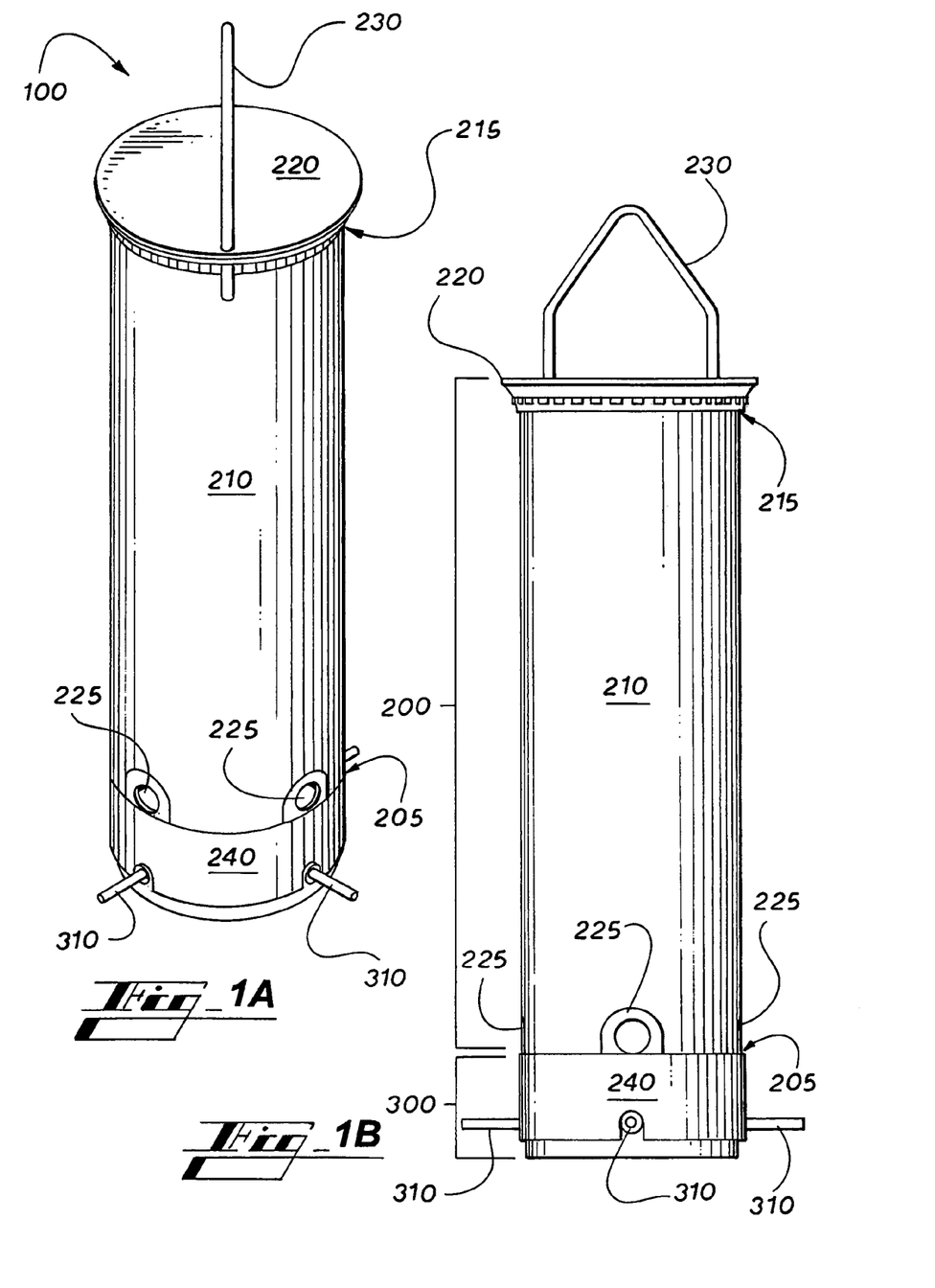
FIG. 1A illustrates a perspective view of an embodiment of a multiple perch pest proof bird feeder.
FIG. 1B illustrates a side view of an embodiment of a multiple perch pest proof bird feeder.

Referring to the drawings wherein like reference numerals designate corresponding parts throughout the several figures, reference is made first to FIG. 1A that illustrates a perspective view of an embodiment of a multiple perch pest proof bird feeder apparatus 100 and to FIG. 1B that illustrates a side view of an embodiment of a multiple perch pest proof bird feeder apparatus 100. In general, the apparatus 100 includes an upper subassembly 200 and a lower subassembly 300 connected to a lower end 205 of the upper subassembly 200. The upper subassembly 200 is generally for retaining feed, typically bird seed and for mounting and hanging. The lower subassembly 300 is generally for providing bird perches 310 as well as housing a motor for providing rotational power to the perches as discussed further in the description below.

The upper subassembly 200 generally includes a feed reservoir 210, which can be transparent for view of the feed from a position external to the apparatus 100. The upper subassembly 200 can further includes a cap 220 positioned on an upper end 215 of the subassembly 200, generally used to cover an opening on the upper end 215, for adding feed to the reservoir 210. In a typical embodiment, the reservoir 210 is a generally elongated hollow cylindrical tube open on both ends. The reservoir 210 generally further includes several openings 225 adjacent the lower end 205 of the upper subassembly 200. The openings 225 are for allowing feed to be available from the reservoir so that birds positioned adjacent the openings 225, typically grasping the perches 310, can obtain feed from the reservoir. A hanger 230 is generally attached to either or both of the reservoir 210 and the cap 220. It is understood that there can be many variations in how the hanger 230 can generally be connected to the upper subassembly 200 depending on the use and general orientation of the hung apparatus 100. It is further understood that the hanger 230 can be a variety of materials, such as but not limited to pre-shaped rigid wire (plastic, metal, etc.), flexible wire (plastic, metal, etc.), rope, string and the like. The hanger 230 can also be positioned along an outer surface of the reservoir for advantageous mounting on posts, or can even be positioned on the lower subassembly 300.

The upper subassembly 200 can further include a base 240 generally connected to the lower end 205 of the upper subassembly 200. The base 240 is generally a hollow cylindrical ring that can be sleeved around a portion of the reservoir at the lower end 205 of the upper subassembly and can further be sleeved around a portion of the lower subassembly 300, which is now described.

Figure 2A:
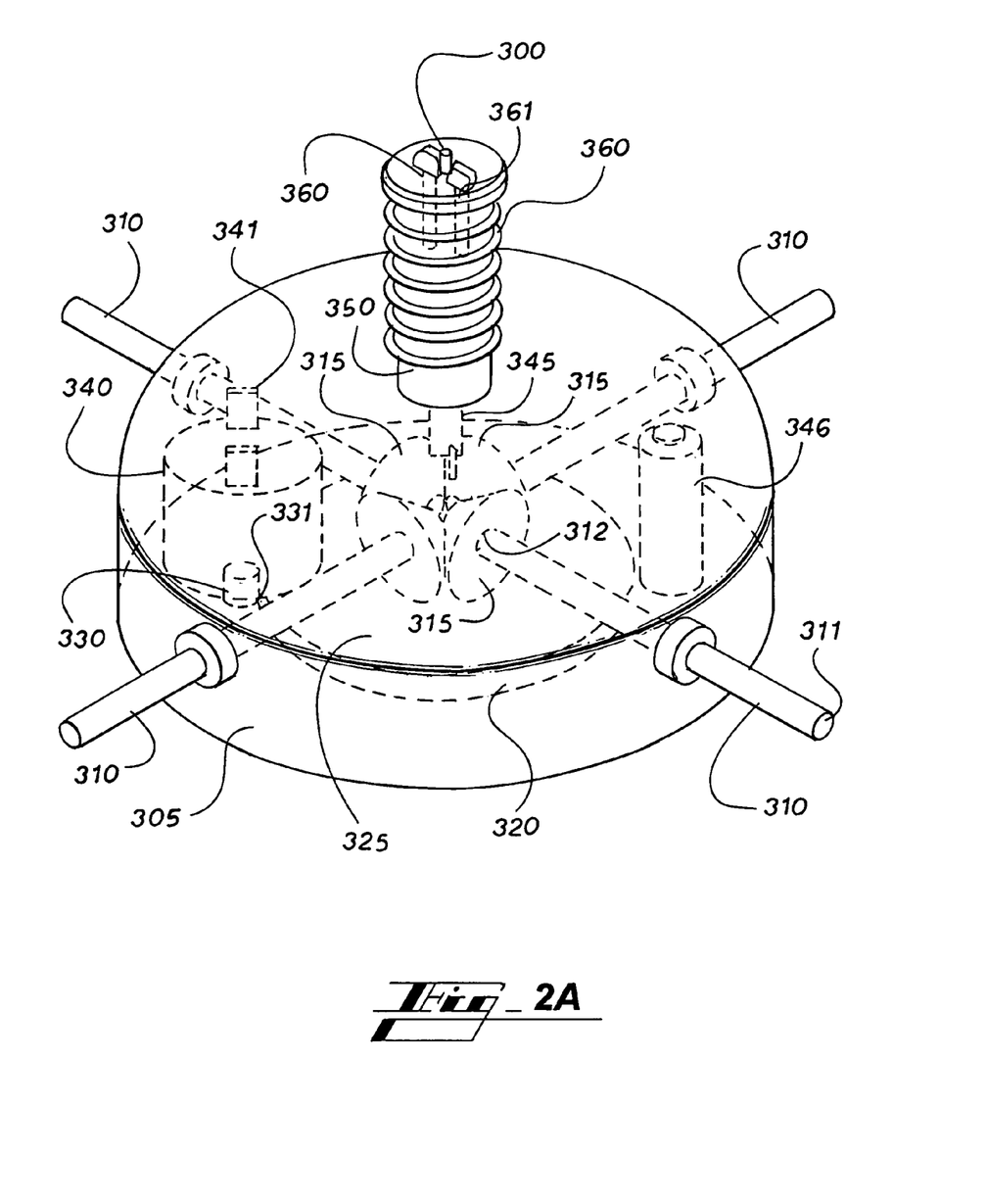
FIG. 2A illustrates a perspective view of an embodiment of a motor/perch assembly.
Figure 2B:
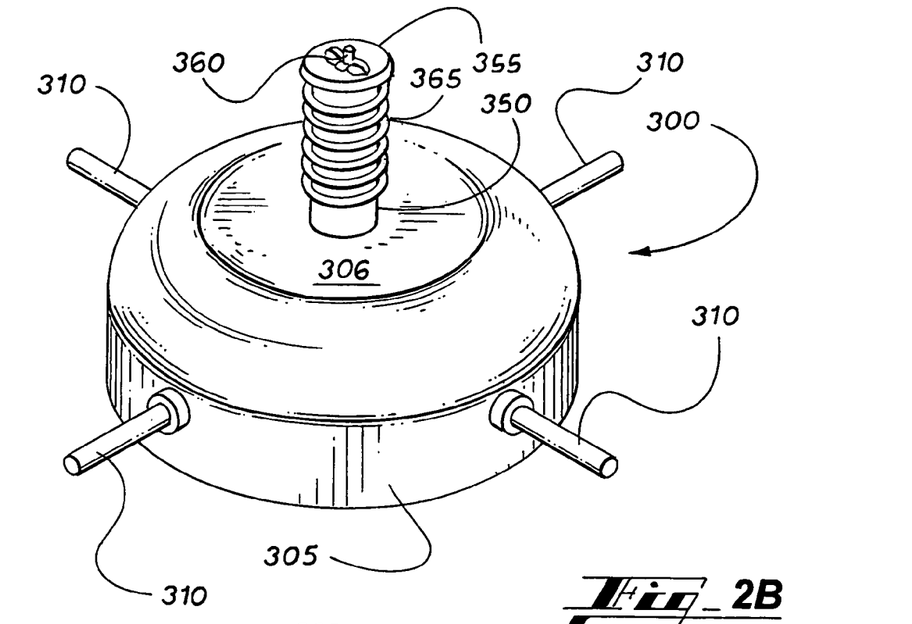
FIG. 2B illustrates a perspective view of an embodiment of a motor/perch assembly.
Figure 2C:
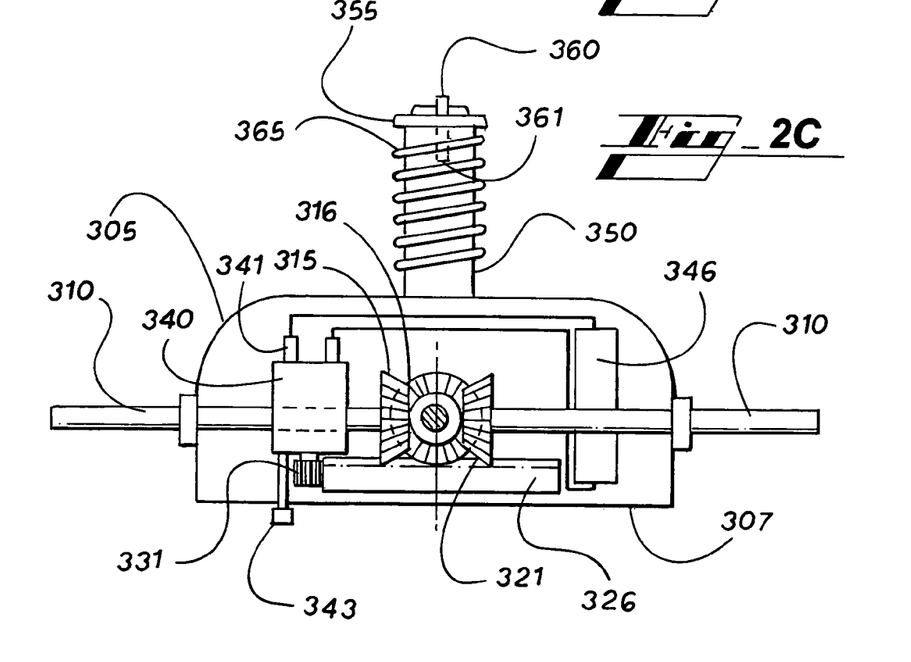
FIG. 2C illustrates a side view of an embodiment of a motor/perch assembly.

FIG. 2A illustrates a perspective phantom view of an embodiment of a motor/perch assembly as lower subassembly 300. FIG. 2B illustrates a perspective view of an embodiment of a motor/perch assembly as lower subassembly 300. FIG. 2C illustrates a phantom side view of an embodiment of a motor/perch assembly as lower subassembly 300. In general, the lower subassembly 300 includes a housing 305 from which the perches 310 protrude so that birds can advantageously perch on the outer ends 311 of the perches 310, to feed from the upper assembly 200. In a typical embodiment, the perches 310 are orthogonally arranged with respect to one another around the perimeter of the housing 305. A perch gear 315, which can be a pinion gear, is connected to each of the perches 310 at an inner end 312 of the perches 310. In general, it is appreciated that the perch gears 315 have a generally trapezoidal profile and are generally circular having gear teeth 316 for engagement with other gear teeth. Therefore, each of the perch gears 315 can advantageously engage with a similar pinion gear 320 having gear teeth 321 and arranged orthogonally and engaged with the gear teeth 316 of the perch gears 315. The pinion gear 320 is further connected to a ring gear 325, which is arranged and rotatably connected generally concentric with a lower surface 307 of the housing 305. The ring gear 325 has outer gear teeth 326. The outer teeth 326 of the ring gear 325 are engaged with gear teeth 331 of motor gear 330 that is coupled to motor 340. The motor 340 can be located within the housing 305 at a location generally adjacent the ring gear 325. The motor 340 can generally include a power switch 345 that provides a closed circuit with a power source 346 such as batteries that typically provide direct current (DC). The power switch 345 can advantageously be located on the lower surface 307 of the housing 305 so that a user can discreetly access the power switch 345 as needed.

The lower subassembly 300 further includes a piston 350 connected generally perpendicular to an upper surface 306 of the housing 305. The piston 350 generally includes an upper ring 355 that can connect an activation switch 360 to the piston 350. In general, the piston 350 and the housing 305 have a contiguous hollow interior so electrical leads 361 can be exposed to the contiguous interior for electrical coupling to the leads 341 of motor 340 within the contiguous interior.

In general, as discussed shortly above, the upper and lower subassemblies 200, 300 of the apparatus 100 are generally connected to each other and coupled by the base 240 of the upper assembly 200.

Figure 3A:
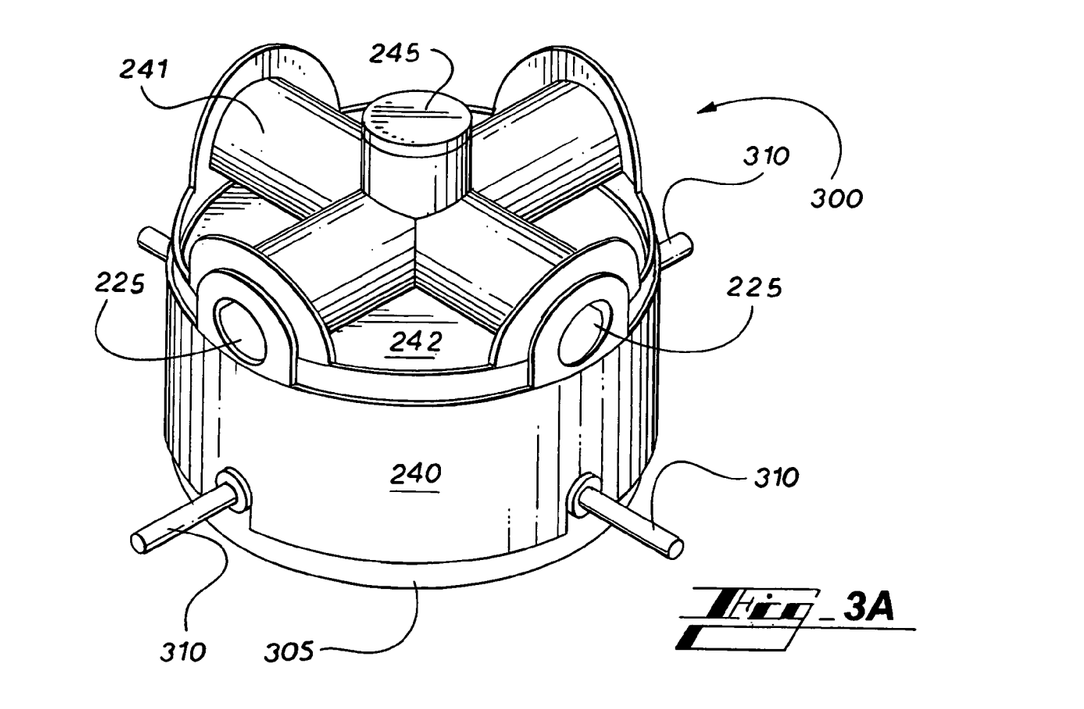
FIG. 3A illustrates a perspective view of an embodiment of a motor/perch assembly within an embodiment of a base.
Figure 3B:
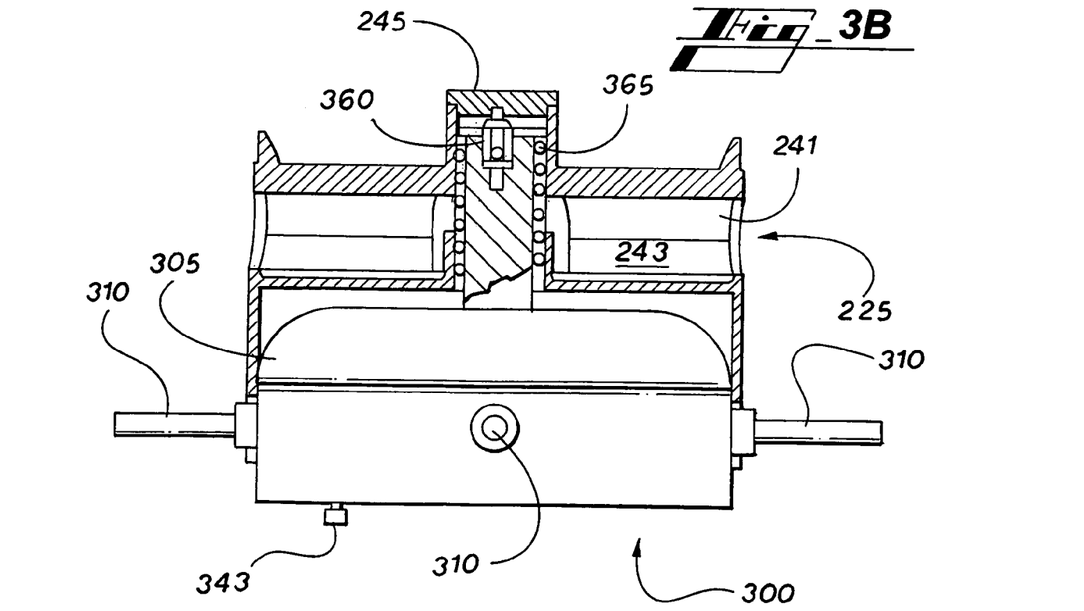
FIG. 3B illustrates a side view of an embodiment of a motor/perch assembly within an embodiment of a base.

FIG. 3A illustrates a perspective view of an embodiment of a motor/perch assembly, lower subassembly 300, within an embodiment of a base 240 from the upper subassembly 200. FIG. 3B illustrates a side view of an embodiment of a motor/perch assembly, lower subassembly 300, within an embodiment of a base 240 of upper subassembly 200. In general, it is appreciated that the housing 305 is generally shrouded by the base 240, but that the perches 310 still advantageously protrude to allow birds to perch, adjacent openings 225 as described above. The openings 225 generally allow access to semi-cylindrical coverings 241, which allow access to a space 243 defined between lower surface 242 of the base 240 and the coverings 241. It is appreciated that feed falls from the reservoir 210 under the force of gravity as feed is removed via the openings 225 so that a constant flow of feed is available so long as the reservoir is kept full. A piston cover 245 generally covers the piston 350, the spring 365, the ring 355 and the activation switch 360. The semi-cylindrical coverings 241 generally terminate at the piston cover 245, which is generally cylindrical and positioned generally perpendicular to the lower surface 242 of the base 240. The piston 350 is generally positioned through the lower surface 242 and within piston cover 245. The spring 365 is generally interposed between the lower surface 242 and the upper ring 355. The positioning of the spring 365 allows a resilient movement of the lower assembly 300 with respect to the base 240. The activation switch 360 is positioned against a portion of the piston cover 245, such that relative movement between the lower assembly 30o and the base 240 can cause the activation switch to be triggered.

Therefore, if a certain weight threshold is exceeded on the perches 310, the activation switch 360 is activated thereby triggering the motor 340 and thereby rotating the perches 310 about their own longitudinal axes. The resiliency of the spring 365 allows the relative positioning of the lower assembly 300 and the base 240 to return to an initially biased position thereby placing the activation switch 360 in an off state. It is generally appreciated that the spring 365, or other suitable resilient device, can be chosen with a pre-determined spring constant or coefficient of restoration such that a pre-determined weight threshold is chosen. It is further appreciated that in a typical embodiment, the rotation of the perches 310 is coupled because each of the perch gears 315 are coupled to the pinion gear 320 that is connected to the ring gear 325. The ring gear 325 is further engaged with the motor gear 330. Therefore, once the motor 340 is energized, the rotation of the motor gear 330 is transferred ultimately to the perches 310 in the form of rotation about the respective longitudinal axes.

In an alternate embodiment of a motor/perch assembly, a spring is generally located on the lower surface generally underneath the subassembly such that the entire subassembly is subject to the resilient motion of the spring. The motor gear is engaged directly to the perch gears, which can all be pinion gears. The activation switch can be directly engaged within an inner surface of the piston cover such that any relative motion between the base and the subassembly can cause activation of the activation switch, and thus energizing of the motor and rotation of the perches.

Figures 4A, 4B:
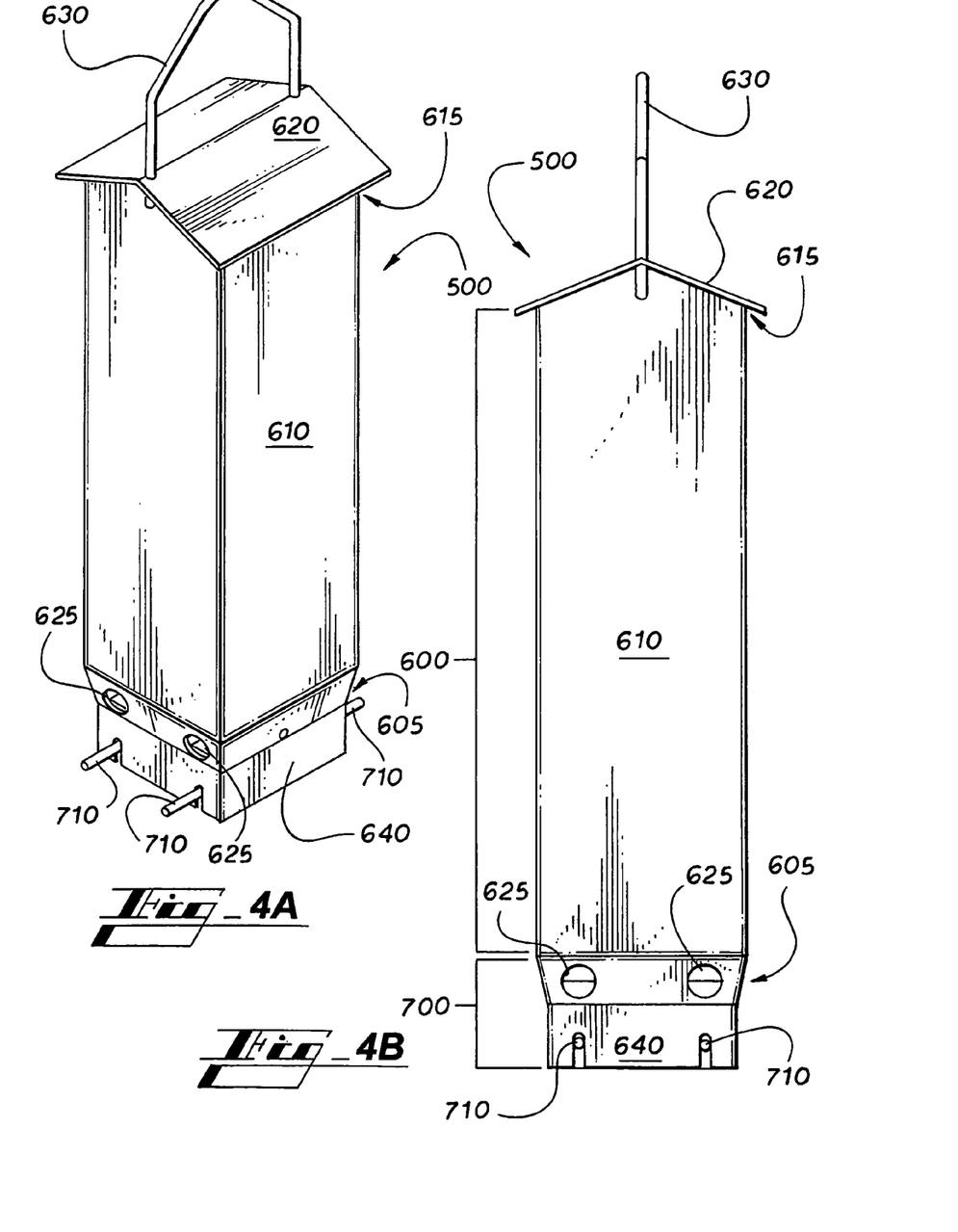
FIG. 4A illustrates a perspective view of an alternate embodiment of a multiple perch pest proof bird feeder.
FIG. 4B illustrates a side view of an alternate embodiment of a multiple perch pest proof bird feeder.

FIG. 4A illustrates a perspective view of an alternate embodiment of a multiple perch pest proof bird feeder apparatus 500. FIG. 4B illustrates a side view of an alternate embodiment of a multiple perch pest proof bird feeder apparatus 500. The alternate embodiment includes several features such as providing a providing a square profile which can include perches 710 on two sides of a lower subassembly 700. In general, the apparatus 500 includes an upper subassembly 600 and a lower subassembly 700 connected to a lower end 605 of the upper subassembly 600. The upper subassembly 600 is generally for retaining feed, typically bird seed and for mounting and hanging. The lower subassembly 700 is generally for providing bird perches 710 as well as housing a motor for providing rotational power to the perches as discussed further in the description below.

The upper subassembly 600 generally includes a feed reservoir 610, which can be transparent for view of the feed from a position external to the apparatus 500. The upper subassembly 600 can further includes a cap 620 positioned on an upper end 615 of the subassembly 600, generally used to cover an opening on the upper end 615, for adding feed to the reservoir 610. In a typical embodiment, the reservoir 610 is a generally elongated hollow cylindrical tube open on both ends. The reservoir 610 generally further includes several openings 625 adjacent the lower end 605 of the upper subassembly 600. The openings 625 are for allowing feed to be available from the reservoir so that birds positioned adjacent the openings 625, typically grasping the perches 710, can obtain feed from the reservoir. A hanger 630 is generally attached to either or both of the reservoir 610 and the cap 620. It is understood that there can be many variations in how the hanger 630 can generally be connected to the upper subassembly 600 depending on the use and general orientation of the hung apparatus 500. It is further understood that the hanger 630 can be a variety of materials, such as but not limited to pre-shaped rigid wire (plastic, metal, etc.), flexible wire (plastic, metal, etc.), rope, string and the like. The hanger 630 can also be positioned along an outer surface of the reservoir for advantageous mounting on posts, or can even be positioned on the lower subassembly 700.

The upper subassembly 600 can further include a base 640 generally connected to the lower end 605 of the upper subassembly 600. The base 640 is generally a hollow cylindrical ring that can be sleeved around a portion of the reservoir at the lower end 605 of the upper subassembly and can further be sleeved around a portion of the lower subassembly 700, which is now described.

Figure 5A:
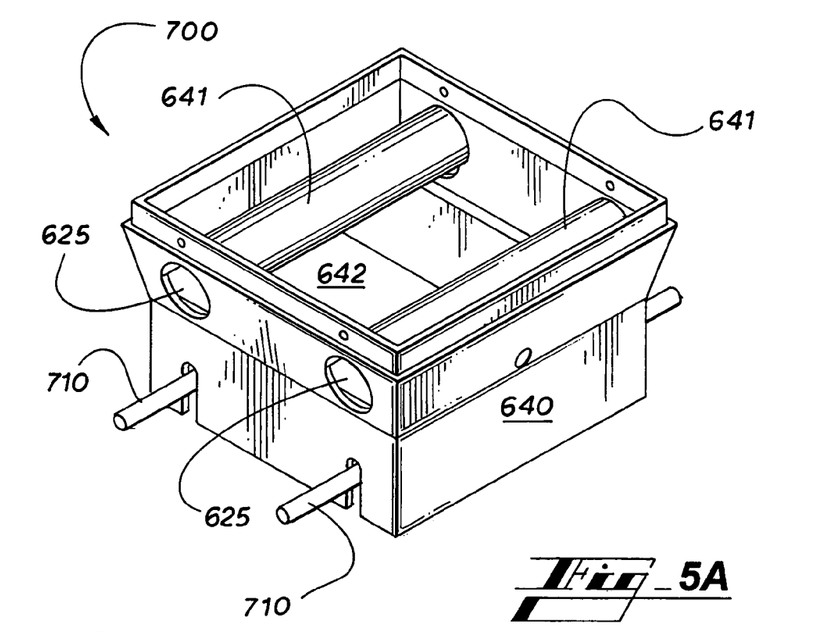
FIG. 5A illustrates a perspective view of an alternate embodiment of a motor/perch assembly within an embodiment of a base.
Figure 5B:
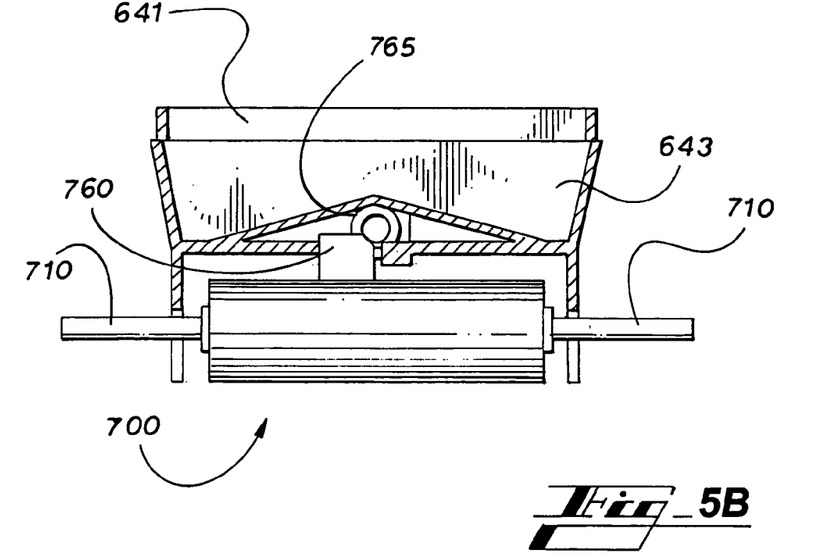
FIG. 5B illustrates a side view of an alternate embodiment of a motor/perch assembly within an embodiment of a base.

FIG. 5A illustrates a perspective view of an embodiment of a motor/perch assembly, lower subassembly 700, within an embodiment of a base 640 from the upper subassembly 600. FIG. 5B illustrates a side view of an embodiment of a motor/perch assembly, lower subassembly 700, within an embodiment of a base 640 of upper subassembly 600. In general, it is appreciated that the housing 705 is generally shrouded by the base 640, but that the perches 710 still advantageously protrude to allow birds to perch, adjacent openings 625 as described above. The openings 625 generally allow access to semi-cylindrical coverings 641, which allow access to a space 643 defined between lower surface 642 of the base 640 and the coverings 641. It is appreciated that feed falls from the reservoir 610 under the force of gravity as feed is removed via the openings 625 so that a constant flow of feed is available so long as the reservoir is kept full. The semi-cylindrical coverings 641 are through connected to respective openings 625.

Figure 6A:
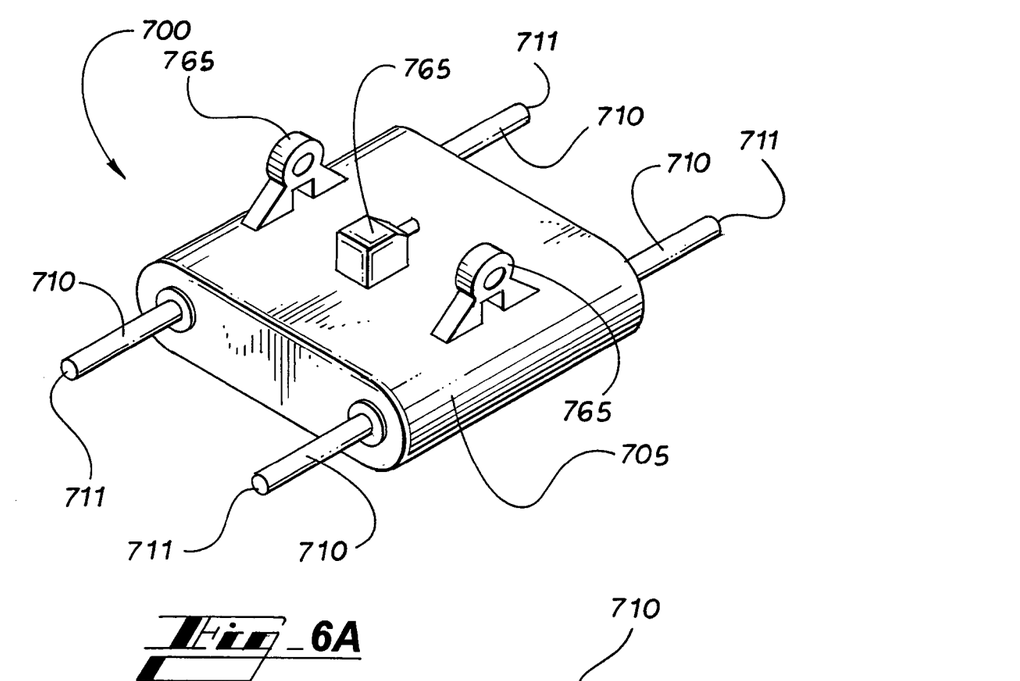
FIG. 6A illustrates a perspective view of an alternate embodiment of a motor/perch assembly.
Figure 6B:
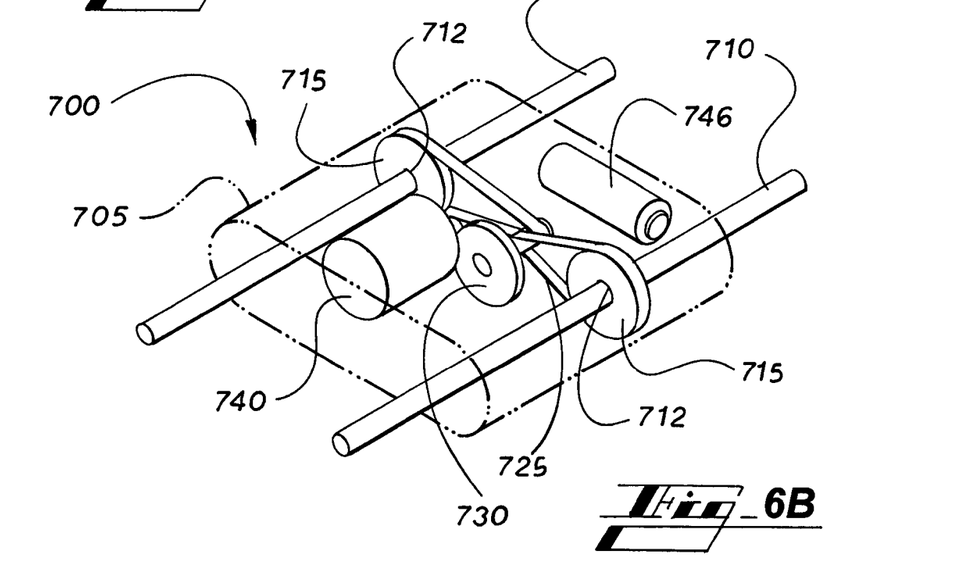
FIG. 6B illustrates a perspective view of an alternate embodiment of a motor/perch assembly.
Figure 7A:
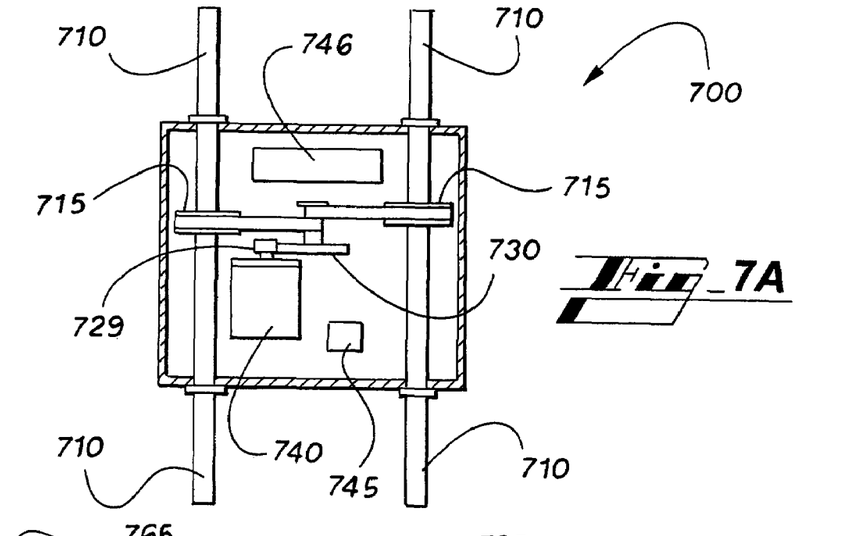
FIG. 7A illustrates a top view of an alternate embodiment of a motor/perch assembly within an embodiment of a base.
Figure 7B:
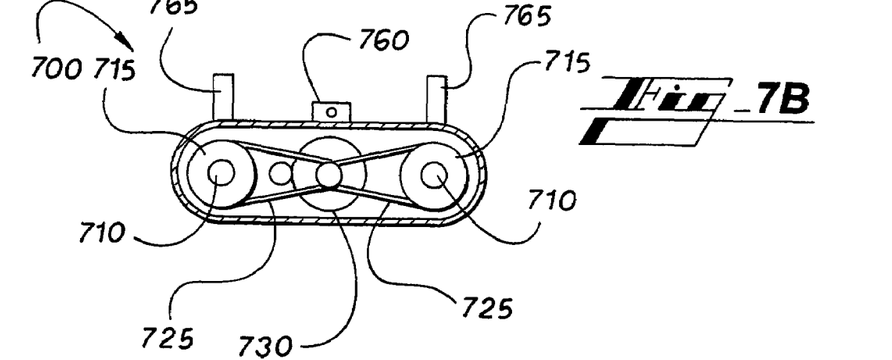
FIG. 7B illustrates a side view of an alternate embodiment of a motor/perch assembly within an embodiment of a base.
Figure 7C:
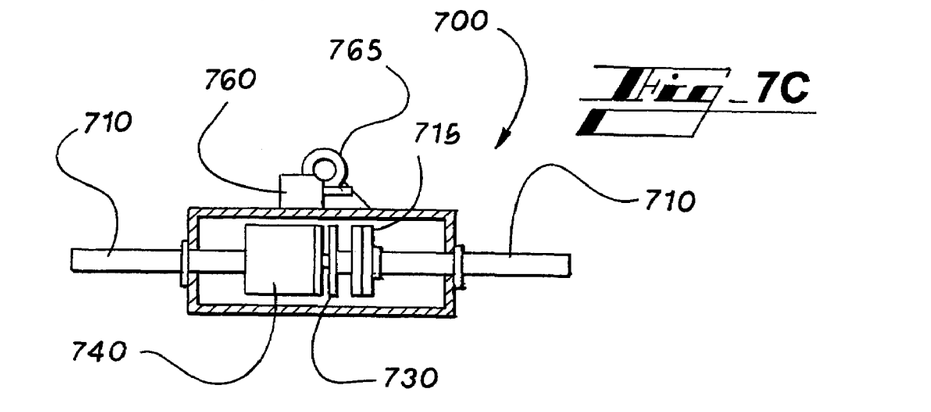
FIG. 7C illustrates another side view of an alternate embodiment of a motor/perch assembly within an embodiment of a base.

Reference is still made to FIGS. 5A and 5B. FIG. 6A illustrates a perspective view of an alternate embodiment of a motor/perch assembly as subassembly 700. FIG. 6B illustrates a perspective view of an alternate embodiment of a motor/perch assembly as subassembly 700. FIG. 7A illustrates a top view of an alternate embodiment of a motor/perch assembly, as subassembly 700, within an embodiment of a base 640. FIG. 7B illustrates a side view of an alternate embodiment of a motor/perch assembly as subassembly 700, within an embodiment of a base 640. FIG. 7C illustrates another side view of an alternate embodiment of a motor/perch assembly, as subassembly 700, within an embodiment of a base 640. In general, the lower subassembly 700 includes a housing 705 from which the perches 710 protrude so that birds can advantageously perch on the outer ends 711 of the perches 710, to feed from the upper assembly 600. In a typical embodiment, the perches 710 are orthogonally arranged with opposing perches being generally oriented along a common longitudinal axis positioned through the housing 705. A perch pulley 715 is connected to each of the perches 710 at an inner end 712 of the perches 710. The perch pulleys 715 are further connected to a belt 725. The belt 725 is further coupled to motor pulley 730 that is coupled to motor 740. The motor 740 can be located within the housing 705 at a location suitable to couple belt 725 with perch pulleys 715. The motor 740 can generally include a power switch 745 that provides a closed circuit with a power source 746 such as batteries that typically provide direct current (DC). In another embodiment, the motor 740 can be connected to a pulley coupler 729 connected directly to motor 740. The pulley coupler 729 is in turn connected to motor pulley 730.

An activation switch 760 is generally connected to the lower subassembly 700 and coupled to the base 640. In a typical embodiment, the activation switch 760 is a three-position switch that includes an off position when biased against an inner surface of the base 640. In a typical embodiment, the lower assembly 700 is pivotally connected to the base 640 via pivot points 765. In general, the lower assembly 700 can swing in either direction generally determined by a weight placed on the perches. By rotating in one direction the three position activation switch 760 is energized into an on position. Similarly, by rotating in the opposite direction the three position activation switch 760 is also energized into an on position. Therefore, if a certain weight threshold is exceeded on the perches 710, the activation switch 760 is activated thereby triggering the motor 740 and thereby rotating the perches 710 about their own longitudinal axes. The natural resiliency of the pivot points 765 allows the relative positioning of the lower assembly 700 and the base 640 to return to an initially biased position thereby placing the activation switch 760 in an off state. It is further appreciated that in a typical embodiment, the rotation of the perches 710 is coupled because each of the perch pulleys 715 are coupled to the belt 725 that is connected to the pulley gear 730, which is either connected directly to the motor 740 or to the coupler 726 that is connected to the motor 740. Therefore, once the motor 740 is energized, the rotation of the motor pulley 730 or coupler 729 is transferred ultimately to the perches 710 in the form of rotation about the respective longitudinal axes.

In still another alternate embodiment of a motor/perch assembly as, a coupler can be connected to the motor and can be a motor gear that is coupled to a ring gear in lieu of the motor pulley. The ring gear can be connected directly to one of the perches that include a perch pulley connected to a belt that connects the other perch pulleys.

In still another alternate embodiment of a multiple perch pest proof bird feeder apparatus, a wishbone pivot point is generally connected to one or more of the perches. A top portion of the wishbone pivot point is coupled to the activation switch such that any side to side movement of the wishbone pivot point causes the wishbone pivot point to engage and thus activate the activation switch.

It is generally appreciated that the embodiments described herein can advantageously be implemented into code or firmware that can cause activation of the multiple perches as desired. Therefore, the software techniques and methods discussed above can be implemented in digital electronic circuitry, or in computer hardware, firmware (as discussed), software, or in combinations of them. Apparatus may be implemented in a computer program product tangibly embodied in a machine-readable storage device for execution by a programmable processor; and methods may be performed by a programmable processor executing a program of instructions to perform functions by operating on input data and generating output. Further embodiments may advantageously be implemented in one or more computer programs that are executable on a programmable system including at least one programmable processor coupled to receive data and instructions from, and transmit data and instructions, to a data storage system, at least one input device, and at least one output device. Each computer program may be implemented in machine language or assembly language which can be assembled or translated, or a high level procedural or object-oriented programming language, which can be complied or interpreted. Suitable processors include, by way of example, both general and special purpose microprocessors. Generally, a processor receives instructions and data from read-only memory and or RAM. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed application specific integrated circuits (ASICs).

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A bird feeder apparatus, comprising:
    a feed reservoir;
    a base connected to said feed reservoir;
    a perch coupled to said base, wherein said perch is comprised of a generally straight rod with a longitudinal axis;
    a motor connected to said perch and held within said base, said motor for rotating said perch about said longitudinal axis of said rod; and
    a means for biasing connected between said motor and said base.

2. The apparatus as claimed in claim 1 further comprising at least one additional perch coupled to said base.

3. The apparatus as claimed in claim 2 wherein said perches include a perching end onto which birds can grasp and a coupling end.

4. The apparatus as claimed in claim 3 wherein said coupling end includes a coupling device for coupling to a respective coupling device.

5. The apparatus as claimed in claim 4 wherein said coupling device is a perch gear.

6. The apparatus as claimed in claim 5 further comprising a ring gear located adjacent said base and coupled to said perch gears.

7. The apparatus as claimed in claim 6 further comprising a motor gear connected to said motor.

8. The apparatus as claimed in claim 7 wherein said motor gear is engaged with said ring gear.

9. The apparatus as claimed in claim 7 wherein said motor gear is engaged with the perch gears.

10. The apparatus as claimed in claim 4 wherein said coupling device is perch pulley.

11. The apparatus as claimed in claim 10 further comprising a motor pulley connected to said motor.

12. The apparatus as claimed in claim 11 further comprising a belt connected between said motor pulley and said perch pulleys.

13. The apparatus as claimed in claim 7 further comprising a ring gear connected to one of said perches and engaged with said motor gear.

14. A bird feeder apparatus, comprising:
    a feed reservoir;
    a feed reservoir base;
    a motor and perch housing shrouded by said reservoir base;

a plurality of perches protruding from said base;

a motor coupled to said perches for causing said perches to rotate about individually respective longitudinal axes when a weight threshold upon said perches is exceeded, and wherein rotation of said perches occurs with the tangential relationship of each said perch relative to said feed reservoir base remaining constant; and an activation switch located within said base, said activation switch energized when a weight is put upon said perches that causes said activation switch to engage with said base thereby providing power to said motor that causes the rotation in said perches.

* * * * *

UNITED STATES PATENT AND TRADEMARK OFFICE
CERTIFICATE OF CORRECTION

| | |
|---|---|
| PATENT NO. | : 7,418,923 B1 |
| APPLICATION NO. | : 11/366346 |
| DATED | : September 2, 2008 |
| INVENTOR(S) | : Michael Banyas and Paul Artigues |

Page 1 of 1

It is certified that error appears in the above-identified patent and that said Letters Patent is hereby corrected as shown below:

On the Title Page (76) delete "Prayer" and insert therefor -- Player --.

Signed and Sealed this

Twenty-first Day of October, 2008

JON W. DUDAS
*Director of the United States Patent and Trademark Office*